United States Patent [19]

Merchant

[11] Patent Number: 5,771,856
[45] Date of Patent: Jun. 30, 1998

[54] METHOD OF REINFORCING THREADS

[75] Inventor: Gerald Merchant, Red Deer, Canada

[73] Assignee: Merch Performance Inc., Red Deer, Canada

[21] Appl. No.: 796,025

[22] Filed: Feb. 5, 1997

[51] Int. Cl.$^6$ .................................................... F02B 77/00
[52] U.S. Cl. ................................ 123/198 R; 29/888.011; 29/240.5
[58] Field of Search ......................... 29/888.011, 402.01, 29/888.09, 240.5; 123/198 R

[56] References Cited

U.S. PATENT DOCUMENTS

| | | | |
|---|---|---|---|
| 3,824,888 | 7/1974 | Brooks | 85/47 |
| 4,570,586 | 2/1986 | Roe | 123/192 B |
| 5,072,697 | 12/1991 | Sputhe | 123/41.69 |
| 5,259,706 | 11/1993 | Gaut | 408/1 R |
| 5,295,773 | 3/1994 | Amoroso | 411/60 |
| 5,363,823 | 11/1994 | Gittlein | 123/196 AB |
| 5,499,892 | 3/1996 | Reed | 29/888.011 |

Primary Examiner—Erick R. Solis
Attorney, Agent, or Firm—Anthony R. Lambert

[57] ABSTRACT

A method of reinforcing threads. Firstly, provide a workpiece. Secondly, determine the position on the workpiece that a hole is to be drilled and into which threads are to be tapped. Thirdly, bore an opening in the workpiece which transversely intersects the hole. The opening must have a diameter which is greater that a diameter of the hole. Fourthly, insert an insert into the opening in interference fit relation. The insert is of a harder material than the workpiece. Fifthly, bore the hole through the workpiece and into the insert. Sixthly, tap threads in the hole, such that a portion of the threads are reinforced by virtue of being tapped into the harder material of the insert.

7 Claims, 1 Drawing Sheet

METHOD OF REINFORCING THREADS

FIELD OF THE INVENTION

The present invention relates to a method of reinforcing threads and, in particular, threads in an aluminum engine block.

BACKGROUND OF THE INVENTION

It is not uncommon for engines to be fabricated from aluminum. In an engine, the aluminum is subjected to variations in temperature. Over time, these variations in temperature result in metal fatigue. The most vulnerable area to metal fatigue is the threads, with metal fatigue leading to thread failure.

German Patent DE 2,920,410 describes a method of reinforcing threads in aluminum or polymer plastic. The method consists of the step of tapping a hole into the aluminum or plastic material needing reinforcement. A thread-reinforcing insert is then inserted into the tapped hole. The thread-reinforcing insert consists of a tubular body with internal and external threads. The external threads permit the thread-reinforcing insert to be screwed into the tapped hole. The thread-reinforcing insert is made of steel or bronze. Bolts are then engaged with the internal threads. The internal threads, being of steel or bronze, are more capable of resisting thread failure. The external threads, which must engage the aluminum to secure the insert in place, can be made of a coarser thread capable of withstanding greater loads.

Through the teachings of the German patent increase the resistance of the threads to metal fatigue, a threshold will eventually be reached when the threads holding the insert in place fail due to metal fatigue.

SUMMARY OF THE INVENTION

What is required is an alternative method of reinforcing threads that will further increase the threshold at which metal fatigue results in thread failure.

According to one aspect of the present invention there is provided a method of reinforcing threads. Firstly, provide a workpiece. Secondly, determine the position on the workpiece that a hole is to be drilled and into which threads are to be tapped. Thirdly, bore an opening in the workpiece which transversely intersects the hole. The opening must have a diameter which is greater that a diameter of the hole. Fourthly, insert an insert into the opening in interference fit relation. The insert is of a harder material than the workpiece. Fifthly, bore the hole through the workpiece and into the insert. Sixthly, tap threads in the hole, such that a portion of the threads are reinforced by virtue of being tapped into the harder material of the insert.

With the method, as described above, the insert lies across the hole into which threads are tapped. It is, therefore, virtually impossible for the insert to be pulled out of position as a result of a force exerted upon the threads.

According to another aspect of the invention there is provided a workpiece, such as an engine block, including a body having a hole drilled in the body into which threads have been tapped. An opening in the body transversely intersects the hole. The opening has a diameter which is greater that a diameter of the hole. An insert is positioned in the opening in interference fit relation. The insert is of a harder material than the body. A portion of the threads in the hole are tapped into the harder material of the insert.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The preferred method of reinforcing threads will now be described with reference to FIGS. 1 and 2.

Figure 1:
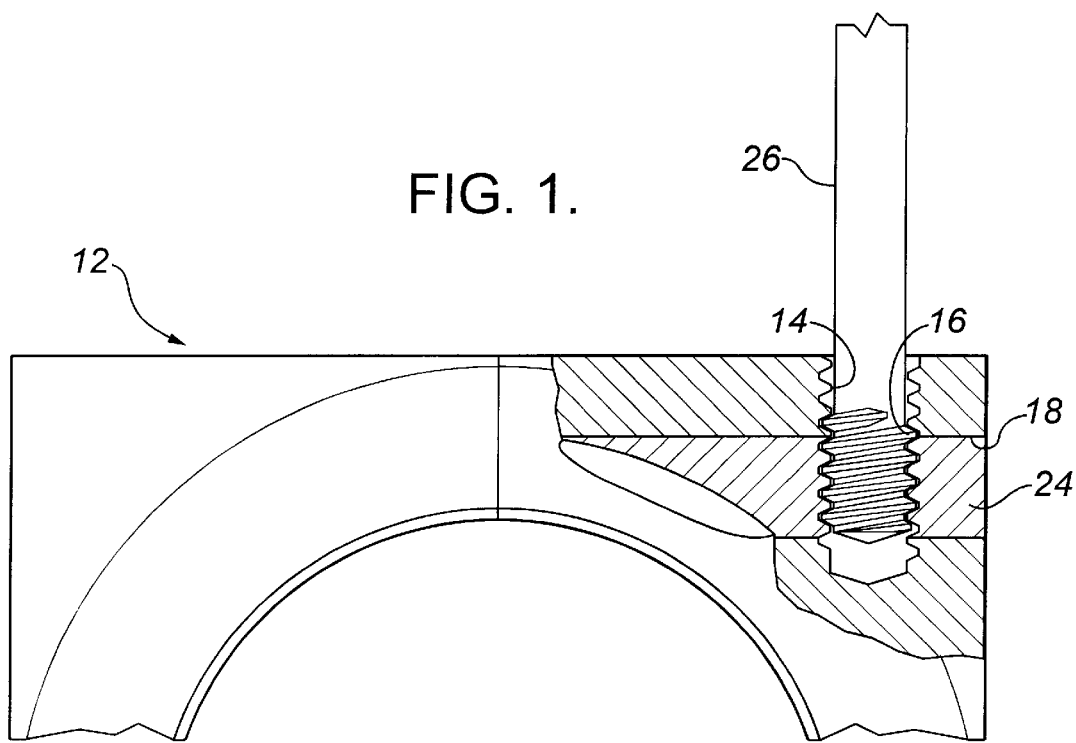
FIG. 1 is a side elevation view, in section, of a portion of an engine block constructed in accordance with the teachings of the present invention.
Figure 2:
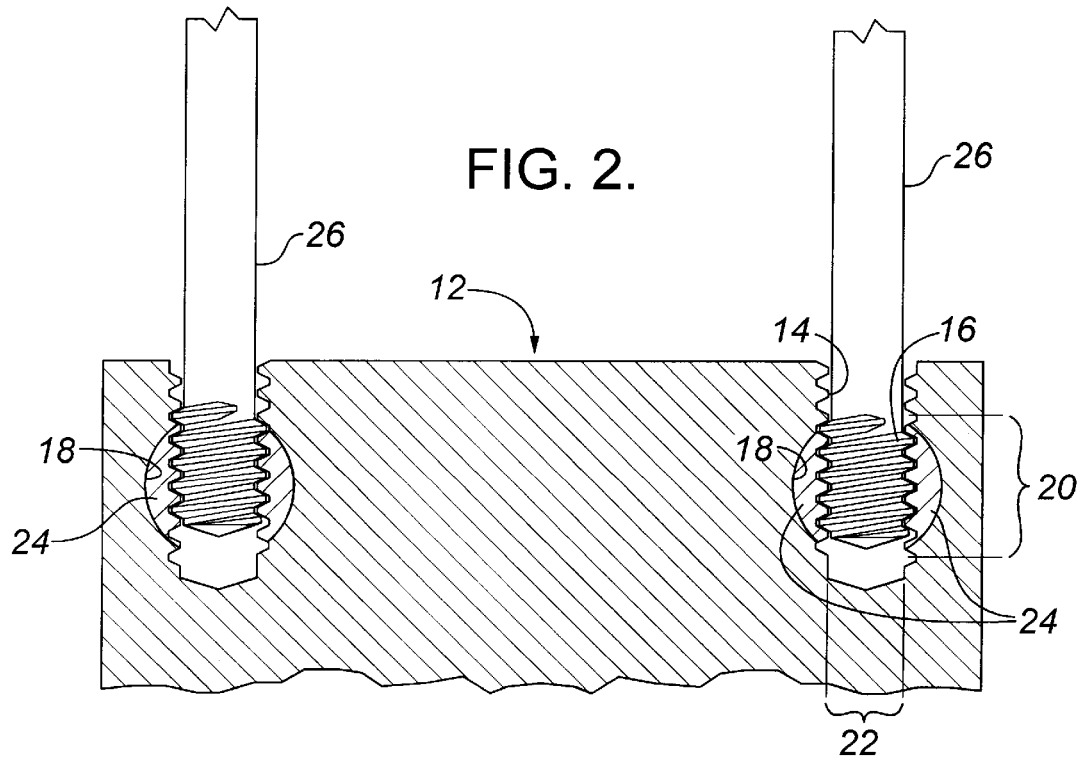
FIG. 2 is an end elevation view, in section, of the portion of the engine block illustrated in FIG. 1.

Firstly, providing a workpiece 12, in FIGS. 1 and 2, an aluminum engine block is illustrated. Secondly, determining the position on workpiece 12 that a hole 14 is to be drilled and into which threads 16 are to be tapped. Thirdly, boring an opening 18 in workpiece 12 which transversely intersects hole 14. Referring to FIG. 2, opening 18 has a diameter 20 which is greater that a diameter 22 of hole 14. Fourthly, inserting an insert 24 into opening 18 in interference fit relation. It is important that insert 24 be of a harder metal than workpiece 12. When reinforcing threads on an aluminum engine block, the preferred material for insert 24 is steel. Fifthly, boring hole 14 through workpiece 12 and into insert 24. Sixthly, tapping threads 16 in hole 14. When a steel bolt 26 is threaded into hole 14, a portion of threads 16 are reinforced by virtue of being tapped into the harder material of insert 24.

Beneficial results have been obtained through the use of the described method in reinforcing aluminum engine blocks. An Insert 24 of steel is used which is ½ inch in diameter and 1½ inches in length. A blind bore style of opening 18 is formed to receive insert 24 in interference fit relation. Opening 18 is positioned at 90 degrees to hole 14, which receives a ⅜ inch barrel stud. It is preferred, but not essential, that insert 24 be interference fit before hole 14 is drilled and threads 16 tapped. It is preferred that insert 24 be installed 0.400 below surface 28 and 0.100 in from surface 30 of engine block 12. It is virtually impossible for insert 24 to be pulled out as a result of a force exerted upon barrel stud bolt 26.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method of reinforcing threads, comprising the steps of:
    firstly, providing a workpiece;
    secondly, determining the position on the workpiece that a hole is to be drilled and into which threads are to be tapped;
    thirdly, boring an opening in the workpiece which transversely intersects the hole, the opening having a diameter which is greater than a diameter of the hole;
    fourthly, inserting an insert into the opening in interference fit relation, the insert being of a harder material than the workpiece;
    fifthly, boring the hole through the workpiece and into the insert; and
    sixthly, tapping threads in the hole, such that a portion of the threads are reinforced by virtue of being tapped into the harder material of the insert.
2. The method as defined in claim 1, the workpiece being made of aluminum.
3. The method as defined in claim 1, the workpiece being an engine block.

4. The method as defined in claim 1 or 2, the insert being steel.

5. An engine block, comprising:

a body;

a hole drilled in the body into which threads have been tapped;

an opening in the body transversely intersecting the hole, the opening having a diameter which is greater than a diameter of the hole;

an insert positioned in the opening in interference fit relation, the insert being of a harder material than the body; and a portion of the threads in the hole being tapped into the harder material of the insert.

6. The block as defined in claim 5, the engine block being made of aluminum.

7. The block as defined in claim 6, the insert being steel.

* * * * *